April 28, 1931. C. REINEKE 1,803,145
INTERNAL COMBUSTION ENGINE
Filed Aug. 13, 1926   3 Sheets-Sheet 1
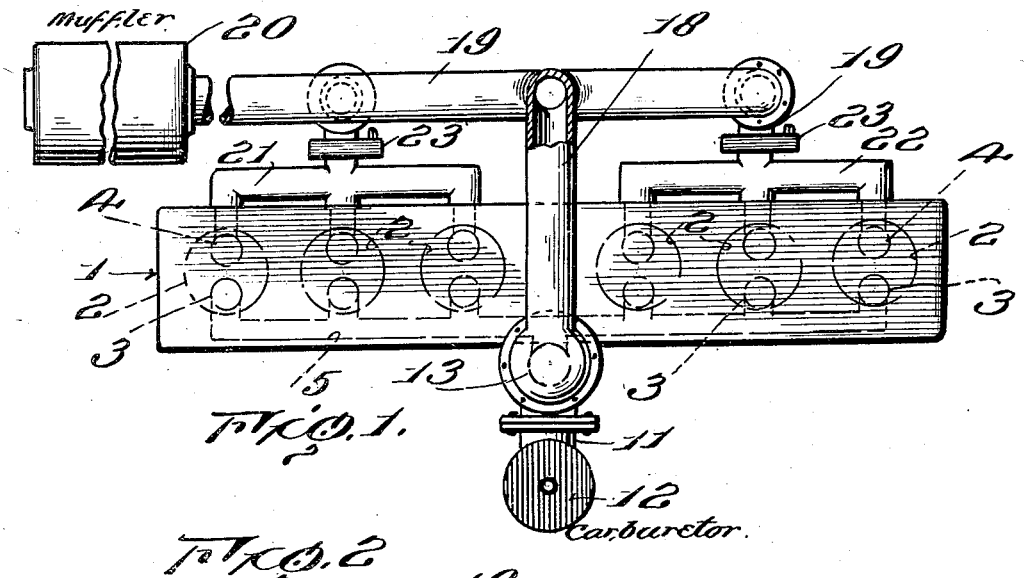
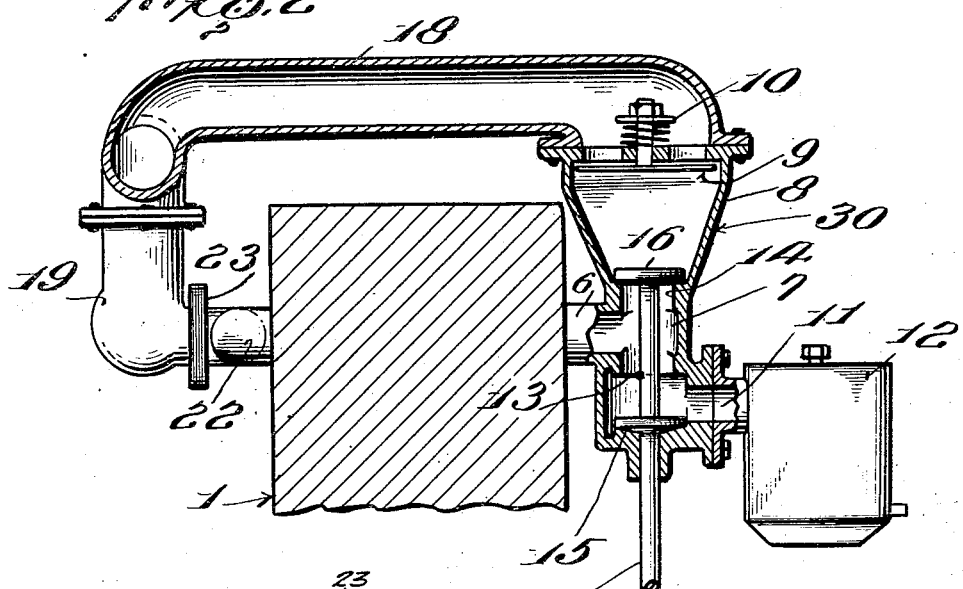
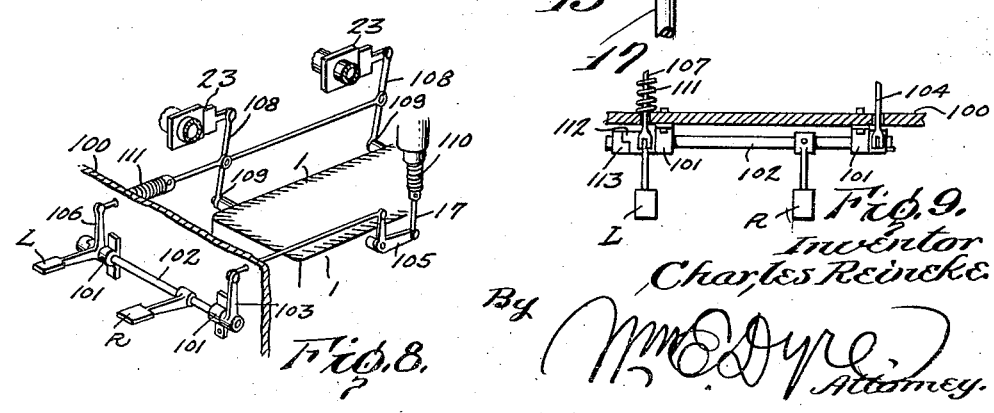
Inventor
Charles Reineke
By Wm E Dye
Attorney

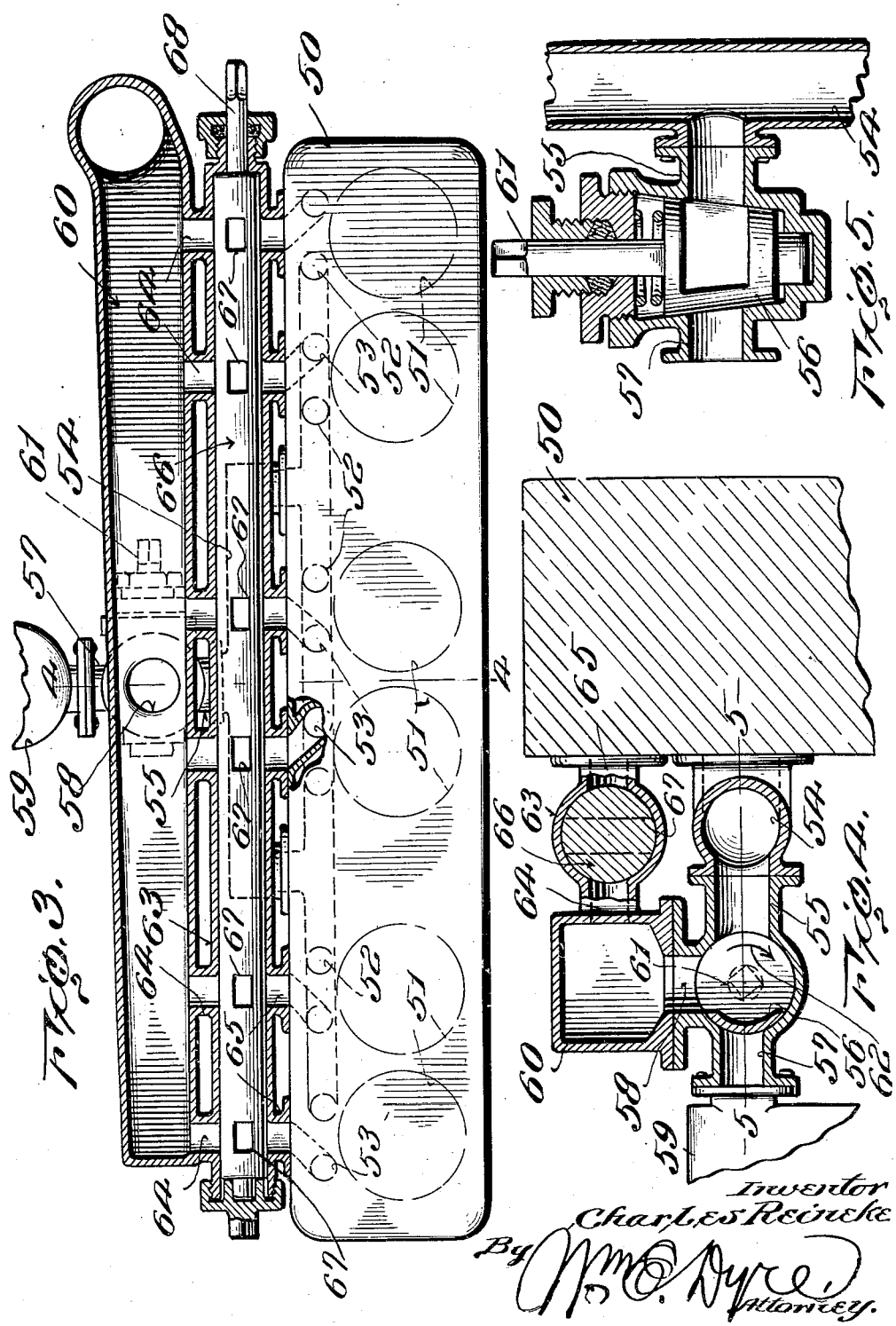

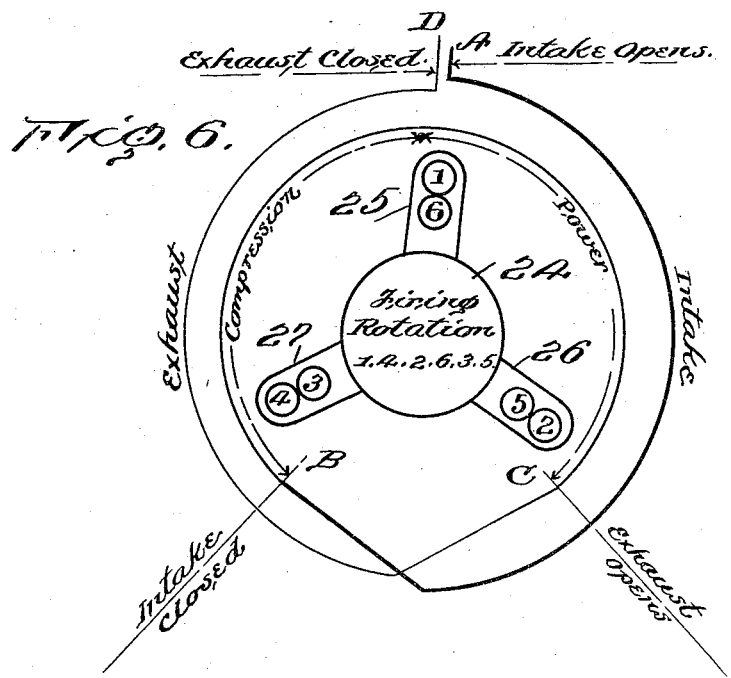
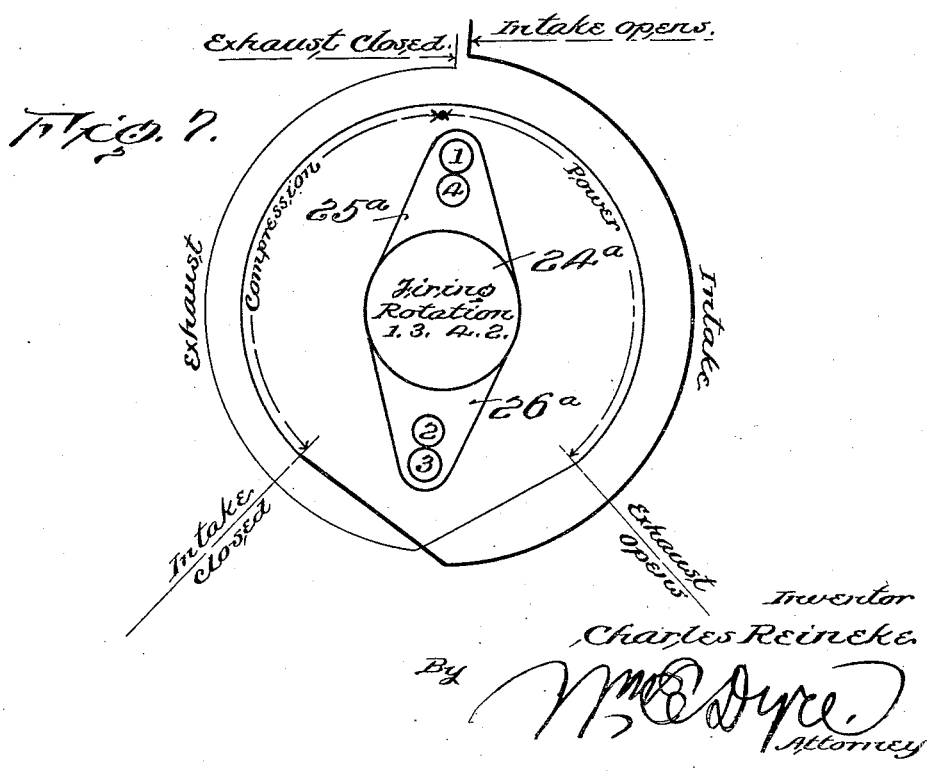

Patented Apr. 28, 1931

1,803,145

UNITED STATES PATENT OFFICE

CHARLES REINEKE, OF NEW YORK, N. Y., ASSIGNOR TO THE REINEKE MOTOR CORPORATION, OF NEW YORK, N. Y., A CORPORATION OF DELAWARE

INTERNAL-COMBUSTION ENGINE

Application filed August 13, 1926. Serial No. 128,970.

This invention relates to improvements in internal combustion engines, and more particularly to attachments for the internal combustion engines of motor vehicles, to permit the engine to function as a brake for the vehicle. The invention also includes means to economize on fuel consumption of the engine.

In U. S. Patent No. 1,629,530, granted to me May 24, 1927, I have disclosed an engine improved to permit the same to function as a brake for a motor vehicle, and the present invention is an improvement on the invention disclosed by that application.

The primary object of the present invention is to provide an engine in which the exhaust pipe is connected to the intake manifold in such manner that exhaust gas may be passed to the intake manifold at certain times during the running of the engine, for the purpose of diluting the fuel mixture and thus economizing in the use of fuel.

A further object of the invention is to provide a multicylinder engine in which the exhaust ports of the cylinders may be closed off from the exhaust pipe to permit the back pressure thus created to brake the vehicle. The engine is also provided with a special intake connection communicating with the exhaust pipe by a conduit having a back pressure valve, so that air may be drawn through the muffler, exhaust pipe, conduit and special intake connection during a braking period, this air being trapped in the intake connection and the intake manifold, and being fed from one cylinder to another through the intake manifold under superatmospheric pressure during braking periods.

Another object of the invention is to furnish an engine of the above character with a special valve cooperating with the intake connection to control the feeding of a mixture of air and fuel, or a mixture of air fuel and exhaust gas into the cylinders during the ordinary operation of the engine. This special valve also functions to close off the carburetor for the purpose of feeding air directly to the cylinders during braking periods.

A still further object of the invention is to furnish an internal combustion engine with means adapted to furnish air under superatmospheric pressure to the cylinders on the suction strokes during braking periods, for the purpose of supercharging the cylinders for more braking power and preventing oil from being drawn into the cylinders from the crank case during suction strokes at the time of braking, or when the momentum of the car drives the engine.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings:

Fig. 1 is a top plan view of an internal combustion engine of the type having an intake manifold at one side and an exhaust pipe on the opposite side; this engine being provided with my improvements.

Fig. 2 is an end view of the same with certain parts of my improvements in vertical section.

Fig. 3 is a top plan view of an engine of the type having the intake manifold and exhaust pipe, both on the same side of the engine, and showing a modification of my invention.

Fig. 4 is a vertical sectional view taken on line 4—4 of Fig. 3.

Fig. 5 is a horizontal sectional view taken on line 5—5 of Fig. 4.

Fig. 6 is a diagram to illustrate the action of a six-cylinder engine provided with my improvements.

Fig. 7 is a similar view to illustrate the action of a four-cylinder engine provided with my improvements.

Fig. 8 is a perspective view, on a reduced scale, of part of an automobile dashboard and engine space showing one form of valve actuating mechanism for use in connection with the embodiment of my invention shown in Figs. 1 and 2.

Fig. 9 is a detail plan view of part of the same.

In the embodiment of the invention illustrated in Figs. 1 and 2, 1 designates the block of a six-cylinder engine, the cylinders of which are designated 2. Each cylinder has the usual engine operated intake valve 3, and exhaust valve 4. In the type of engine illustrated, the intake valves are all arranged at one side of the block, and the exhaust valves are all arranged at the opposite side of the block. The ports controlled by the intake valves communicate with an intake manifold 5, which, as shown in Fig. 2, communicates with the branch 6 of a special intake connection. This intake connection has a vertical passageway 7, the upper end of which flares, as shown at 8, and is partially controlled by a suction opened check valve 9, held to seat by a spring 10. The lower end of the vertical passageway communicates by a port 11 with an ordinary carburetor 12. The passageway 7 includes a port 13 through which the fuel mixture may pass to the cylinders by way of conduit 6, and the passageway 7 also includes a port 14 through which air or exhaust gas may be passed to the cylinders.

The port 13 is controlled by a valve 15, and the port 14 by a valve 16, both of these valves being fixed on an operating rod 17.

From Fig. 2, it may be seen that the valves 15 and 16 are in position to permit ordinary operation of the engine, that is, to allow the usual feed of an explosive mixture from the carburetor to the cylinders. When the valve stem 17 is raised slightly, the explosive mixture may be diluted with exhaust gas, which will be fed to the passageway 7 by way of a conduit 18, the latter having one of its ends connected to the flared inlet 8, and its other end connected to the exhaust pipe 19. If the valve stem 17 is moved to its highest position, the valve 15 will close the port 13, and then air may be fed through the port 14 to the cylinders. This air will enter the muffler 20 and travel through the pipes 19 and 18 during such operation. By passing the air through the muffler, any hissing noise is eliminated.

The exhaust pipe 19 is connected to the cylinders by special branches 21 and 22, each provided with an auxiliary exhaust cut-off valve 23 which may be connected to the valve stem 17 by the common control mechanism shown in Figs. 8 and 9, and hereinafter particularly described.

In the ordinary operation of the engine, the valves 15 and 16 will be in the position shown in Fig. 2, and the auxiliary exhaust valves 23 will be open. This will permit the usual feed of the explosive mixture from the carburetor to the cylinders, and the ordinary discharge of the exhaust gases into the exhaust pipe 19 and out through the muffler.

While the vehicle is traveling along a relatively level road, and going, say about 20 miles an hour, the operator may raise the stem 17 slightly, and permit the other parts of the engine to remain as before. Then, due to the suction of the engine, some of the exhaust gas may blow through pipe 18, past valve 9 and through port 14, and it will intermingle with the fuel mixture passing to the cylinders. In this way, fuel may be saved, and any unconsumed fuel in the exhaust gases, will pass a second time to the cylinders.

When the operator desires to use the engine for coasting purposes, for instance, in going down a hill or when the car is proceeding under its own momentum, then the stem 17 is moved to its uppermost position, so that it closes off the carburetor from the engine. Then the valves 23 will be open, and any gaseous fluid drawn into the cylinders will have to come to the same through pipe 18. Consequently, air will be drawn through the muffler 20 and pipes 19 and 18, and past the check valve 9 into the passageway 7, where, during the intake strokes of the pistons, it will be drawn into the cylinders.

The action of the engine during braking periods will now be described in connection with Fig. 6. From this figure, it may be seen that an ordinary six-cylinder engine has a crank shaft 24 provided with crank arms 25, 26 and 27. Actually, the crank shaft will have six of these arms arranged in pairs, the arms 25 of the cylinders 1 and 6 being arranged in alignment one behind the other; the arms 26 of the second and fifth cylinders being arranged in alignment one behind the other and so on.

From this Figure, it may be seen that the firing order of the cylinders is 1—4—2—6—3—5, and it is assumed that the piston of cylinder No. 1 has just passed over top dead center. At this time, its intake valve will open and air will be fed through the passageway 7 into the cylinder while the crank of cylinder 1 is passing from the point A to the point B, that is, as long as its intake valve is open. At the same time, the piston in cylinder No. 6 is moving downwardly under its power stroke, and during this time, both its intake and exhaust valves are closed. The exhaust valve of cylinder No. 6 will remain closed until its crank arm reaches point C, and then said valve will open, and as the crank arm 25 of this cylinder proceeds around past lower dead center, its piston will begin to compress the gaseous fluid in this cylinder into the closed exhaust branch 21. As the exhaust valves of cylinders 4, 5 and 6 will never be simultaneously open, it will be appreciated that the piston in cylinder 6 will continue to compress the gaseous fluid until the crank arm of cylinder 6 has passed top dead center, and during this compression, the pressure will rise substantially equal to the compression pressure of which the engine is capable.

In the meantime, the crank arm 25 of cylinder 1 is on the compression stroke, and is moving from point B to point A, and of course, during this time the piston is acting against the compression pressure as both the intake and exhaust values of cylinder No. 1 are closed. As a result, the air trapped in cylinder No. 1 will exert back pressure and aid in the braking.

Since the crank arm 25 of the cylinder No. 6 has reached the point A, that is about six and one-half degrees beyond dead center, the intake valve of cylinder 6 will open, and the gaseous fluid compressed in cylinder No. 6 during the exhaust stroke, will rush out into the intake manifold, but will be prevented from discharging from this manifold by the check valve 9. Consequently, the pressure in the intake manifold will rise, and as the piston in cylinder No. 2 is now on its suction stroke, with its intake valve open, this superatmospheric pressure will pass through the intake manifold into cylinder No. 2, and as this will happen before the crank arm 26 of cylinder No. 2 has reached lower dead center, it will be realized that the superatmospheric pressure applied to cylinder No. 2 will break the suction exerted by the piston in that cylinder, and will thus prevent the suction from drawing oil up into the cylinder from the crank case during the suction stroke. As the same conditions are present during the suction stroke of each piston, it will be appreciated that the suction is never permitted to rise to a point where a cylinder will pump oil from the crank case.

Referring again to the diagram shown in Fig. 6, we will now assume that the crank arm of cylinder No. 1 has completed an entire revolution, and is commencing on its power stroke. At this time, both its intake and exhaust valves will be closed, and this condition will continue until the crank arm of cylinder No. 1 reaches point C on its second revolution. At this point, its exhaust valve opens, and any excess pressure in this cylinder will now pass into the exhaust branch 22. As the valve 23 is closed, it will be recognized that as the crank arm 25 proceeds from point C to point D, the piston of cylinder 1 will be compressing into the branch 22. When the crank arm of cylinder 1 has passed from point D to point A, the intake valve of cylinder 1 will open, and highly compressed gaseous fluid in this cylinder will rush out into the intake manifold, and as this manifold is closed by the valves 9 and 15, the excess pressure will travel through the manifold to the intake port of the cylinder which is on its intake stroke, in this particular instance, the cylinder No. 5.

From the foregoing, it will be observed that when the engine is used for braking purposes, the valves 23 are closed to prevent any gaseous fluid during the exhaust stroke from traveling through the exhaust pipe from one cylinder to another, whose exhaust valves might happen to be open simultaneously. On the other hand, the intake manifold communicates at all times with the intake ports of all of the cylinders, so that at the beginning of an intake stroke, the compressed exhaust fluid will rush out of one cylinder into the intake manifold. This exhaust fluid under superatmospheric pressure will immediately enter a cylinder whose piston is on the intake stroke, and this will immediately build up pressure in the cylinder undergoing suction, thus creating a higher initial pressure and consequently a higher pressure than the regular compression pressure for braking purposes, and prevent the cylinder from pumping oil from the crank case.

In the diagram shown in Fig. 7, 24a indicates the crank shaft of a four-cylinder engine, provided with crank arms 25a and 26a, there being two crank arms 25a, one arranged behind the other, and these crank arms co-operating with the pistons in cylinders Nos. 1 and 4. The crank arms 26a are arranged one behind the other, and they cooperate with the cylinders Nos. 2 and 3. As the firing rotation of this four-cylinder engine is 1—3—4—2, the operation may be readily understood in connection with the description given with Fig. 6.

The area of the valve housing or casing 30 which encloses the passageway 7 is sufficiently large to permit the atmospheric inlet to be opened to some extent, while the gas intake passageway is still large enough to take care of the full capacity of the carburetor.

Figs. 8 and 9 show one form of actuating linkage for the valves 23 and 17. In these figures, 1 indicates the engine block partially cut away to show more clearly all elements of the linkage. The dashboard is designated 100, and to this dashboard are secured two bearings 101 for a transverse shaft 102. Keyed to this shaft is a right pedal R, and loosely sleeved on the shaft is a left pedal L. On the end of the shaft nearest the pedal R is keyed the arm 103, connected by the link 104 to the vertical arm of bellcrank 105 which is pivoted to the engine block 1, and whose horizontal arm is pin connected to the valve stem 17. Pedal L constitutes the horizontal arm of a bellcrank, the vertical arm 106 being connected by the link 107 to a pair of third class levers 108, fulcrumed on the engine block at 109 and pin connected to the gates of the valves 23. The valves 15 and 23 are maintained normally open by the springs 110 and 111 respectively. The sleeve portion of pedal L which fits loosely over the shaft 102 is provided with a projection 112, and keyed on the end of the shaft 102 is a short sleeve having a complementary projection 113 normally abutting against the projection 112.

It will be apparent from the foregoing that when pedal R is depressed, valve stem 17 will be raised, while the valves 23 will remain open. When, however, pedal L is depressed, valves 23 will be closed, and, through the medium of projections 112 and 113, shaft 102 will be rotated to lift valve stem 17, thereby also closing valve 15 and opening valve 16. By depressing one or the other of these pedals, therefore, the different combinations of valve actuation may be readily effected to bring about the different functions of an engine equipped with my improvements, as has been hereinbefore explained in detail.

In the form of the invention illustrated in Figs. 3 to 5 inclusive, 50 designates the cylinder block having six cylinders 51, each provided with an intake valve 52 and an exhaust valve 53. In this form, both valves are arranged at the same side of the cylinder, and the ports controlled by the intake valves communicate with an intake manifold 54, provided, as best shown in Figs. 4 and 5, with a valve casing 55, containing a plug valve 56. This valve controls two ports 57 and 58, the former communicating with the carburetor 59, and the latter communicating with the exhaust pipe 60. The plug valve is preferably of the rotary type and has a control stem 61, and when this valve is arranged as shown in Fig. 4, air may be drawn through the muffler, (not shown) and exhaust pipe 60 into the intake manifold 54, from which it may enter the cylinders, when the engine is used for braking purposes. When the valve is turned slightly in the direction of the arrow 62, it will partially open both ports 57 and 58 to permit exhaust gas to be intermingled with the fuel mixture for diluting said mixture to economize fuel.

A valve casing 63 is arranged between the exhaust pipe and the cylinders, and it has six pairs of aligned ports 64 and 65, the former communicating with the exhaust pipe, and the latter communicating with the exhaust ports of the engine cylinders. A rotary valve 66 is arranged in the casing 63 and has six ports 67, adapted in one position of the valve to place the ports 64 and 65 in communication. When this valve is turned to the position shown in the drawings, the exhaust ports of the cylinders will be closed off from the exhaust pipe 60, and that is the position which the valve is moved to for braking purposes. To permit actuation of the valve, the latter has a stem 68 which may be controlled in any suitable manner.

The operation of this form of the invention is exactly the same as that of the engine shown in Figs. 1 and 2, the only differences being due to the arrangement of intake and exhaust at one side of the cylinders instead of at opposite sides of the cylinders.

While I have disclosed preferred embodiments of the invention, it will be obvious to those skilled in the art, that various changes may be made in the details disclosed without departing from the spirit of the invention as expressed in the claims.

What I claim and desire to secure by Letters Patent is:

1. A multi-cylinder engine including an intake conduit and an exhaust conduit, intake and exhaust valves for the cylinders, means for closing the exhaust coduit to prevent the escape of gaseous fluid from the cylinders through said exhaust conduit, and to prevent the passage of gaseous fluid from the exhaust port of one cylinder to the exhaust port of another cylinder while the exhaust valves of those cylinders are simultaneously open, and means combined with the intake conduit to permit gaseous fluid discharged through the intake port of one cylinder into the intake conduit, to readily pass to the intake port of another one of said cylinders, when the intake valves of both cylinders are simultaneously open.

2. In a multi-cylinder engine, cylinders having intake ports and intake valves, an intake conduit communicating with said ports, exhaust ports and exhaust valves for the cylinders, an exhaust conduit communicating with said exhaust ports, a muffler for the exhaust conduit, means for closing the exhaust conduit to prevent the passage of gaseous fluid from the cylinders through said exhaust conduit, a carburetor communicating with the intake conduit, a passageway placing the intake conduit in communication with the exhaust conduit and connected to the exhaust conduit at a point between the muffler and said means, and valve means to control the passage of exhaust gas or air from the exhaust conduit to the intake conduit.

3. In a multi-cylinder engine, cylinders having ordinary intake and exhaust ports, and ordinary intake and exhaust valves controlling said ports, an exhaust conduit communicating with the exhaust ports of the cylinders, means cooperating with said conduit to prevent gaseous fluid from being discharged from the cylinders through said exhaust conduit, an intake conduit communicating with said intake ports, a carburetor communicating with said intake conduit, a passageway placing the conduits in communication, and valve means adapted to close communication between the intake conduit and carburetor, and to open communication between the intake conduit and said passageway, to permit air to be drawn through the exhaust conduit into the intake conduit.

4. A multi-cylinder internal combustion engine including cylinders having ordinary intake and exhaust ports, and ordinary intake and exhaust valves for controlling said ports, means cooperating with the exhaust ports for preventing a gaseous fluid from being discharged from the engine through said exhaust ports, said means being also arranged to prevent the passage of gaseous fluid from the exhaust port of one cylinder to the exhaust port of another cylinder while the exhaust valves of both cylinders are simultaneously open, and means for feeding a gaseous fluid to the intake ports of the cylinders, said last mentioned means permitting the passage of gaseous fluid from one cylinder to another while the intake valves of both cylinders are simultaneously open.

5. In a multi-cylinder engine, cylinders having the usual exhaust ports and exhaust valves, an exhaust pipe, a valve casing interposed between said pipe and ports, and a single valve in the casing for closing communication between all of the exhaust ports and said pipe.

6. In a multi-cylinder engine, cylinders having ordinary intake and exhaust ports and ordinary intake and exhaust valves controlling said ports, an exhaust conduit communicating with the exhaust ports of the cylinders, means cooperating with said conduit to prevent gaseous fluid from being discharged from the cylinders through said exhaust conduit, a muffler for said exhaust conduit, an intake conduit communicating with said intake ports, a carburetor communicating with said intake conduit, a passageway placing the conduits in communication and connected to the exhaust conduit at a point between the muffler and said means, and valve means adapted to close communication between the intake conduit and carburetor, and to open communication between the intake conduit and said passageway, to permit air to be drawn through the exhaust conduit into the intake conduit.

7. In a multi-cylinder engine, cylinders having intake ports and intake valves, an intake conduit communicating with said ports, an exhaust conduit, a passageway placing the conduits in communication, valve means interposed between said cylinders and said exhaust conduit, and means for actuating said valve means, when the engine is used for braking purposes, whereby gases compressed in said cylinders are prevented from discharging to the atmosphere or from passing from one cylinder to another during simultaneous exhaust strokes of the two last mentioned cylinders.

8. In a multi-cylinder engine, cylinders having intake ports and intake valves, exhaust ports and exhaust valves, an intake conduit communicating with said intake ports, an explosive mixture inlet for said conduit and a valve for said inlet, an exhaust conduit communicating with said exhaust ports, a passageway placing the conduits in communication, cut-off valve means interposed between said exhaust valves and said exhaust conduit, and means for closing said inlet and cut-off valves.

9. In a multi-cylinder engine, cylinders having intake ports and intake valves, exhaust ports and exhaust valves, an intake conduit communicating with said intake ports, an explosive mixture inlet for said conduit and a valve for said inlet, an exhaust conduit communicating with said exhaust ports, a passageway placing the conduits in communication, cut-off valve means interposed between said exhaust valves and said exhaust conduit, and means for simultaneously closing said inlet and cut-off valves.

10. In a multi-cylinder engine, cylinders having intake ports and intake valves, an intake conduit communicating with said ports and provided with an explosive gas inlet and a non-explosive gas inlet, valve means for alternatively opening one of said inlets and closing the other, exhaust ports and an exhaust conduit, a passageway placing said exhaust and intake conduits in communication, valve means interposed between said cylinders and said exhaust conduit, and means for actuating said last mentioned valve means, when the engine is used for braking purposes, whereby gases compressed in said cylinders are prevented from discharging to the atmosphere or from passing from one cylinder to another during simultaneous exhaust strokes of the two last mentioned cylinders.

11. In a multi-cylinder engine, cylinders having ordinary intake and exhaust ports, and intake and exhaust valves controlling said ports, an intake conduit communicating with the intake ports, and an exhaust conduit communicating with the exhaust ports, a muffler for the exhaust conduit, means for closing the exhaust conduit to prevent the passage of gaseous fluid from the cylinders through said exhaust conduit, a passageway placing said conduits in communication and connected to the exhaust conduit at a point between the muffler and said means, a carburetor communicating with the intake conduit, and valve means adapted to close communication between said conduits, said valve means in one position permitting the gaseous contents of the exhaust conduit to enter the intake conduit.

In testimony whereof I affix my signature.

CHAS. REINEKE.